Figure 1:
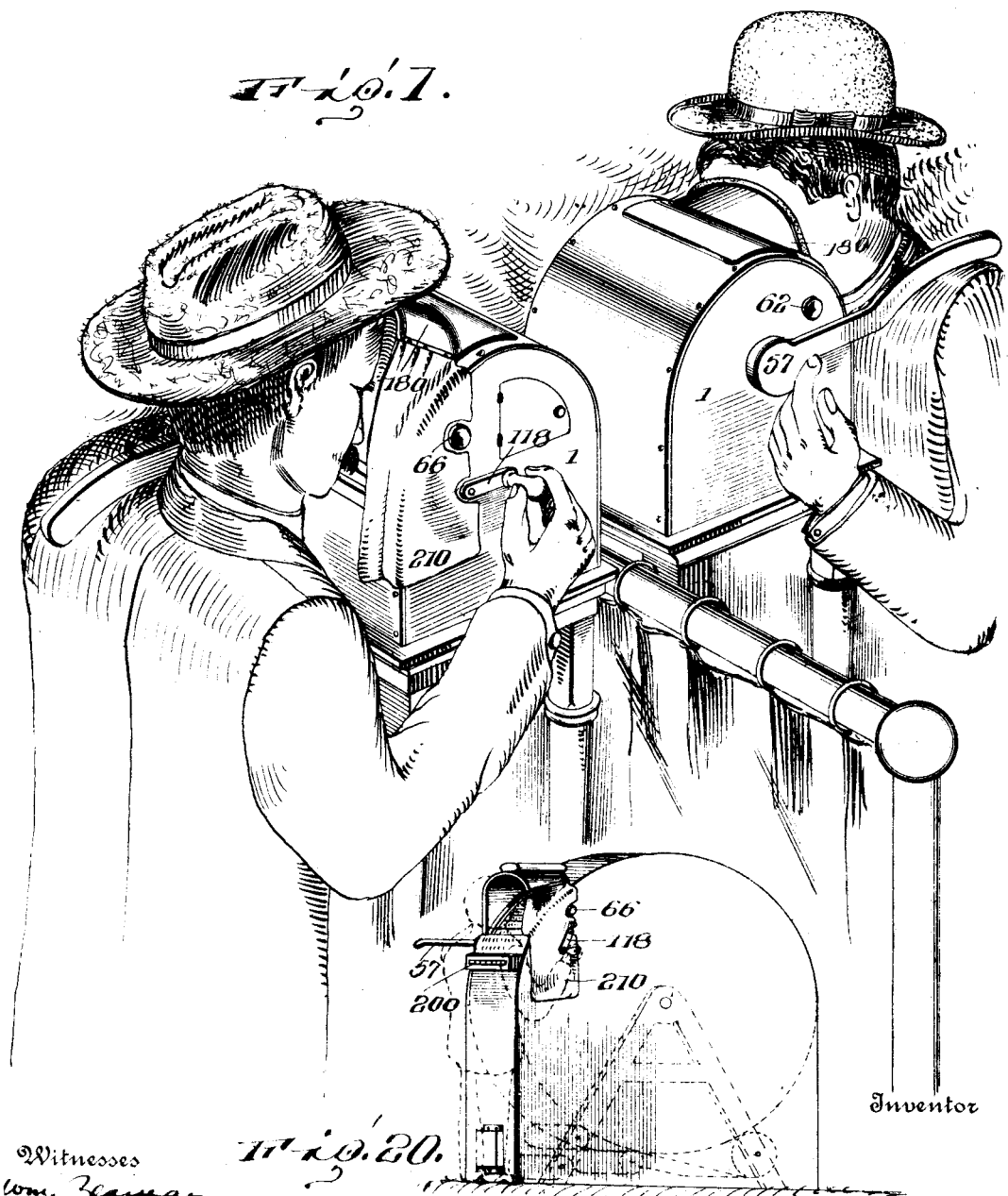

J. C. WILSON.
VOTING MACHINE.
APPLICATION FILED DEC. 21, 1911.

1,038,810.

Patented Sept. 17, 1912.

8 SHEETS—SHEET 1.

Witnesses

Inventor
J. C. Wilson
By
Attorney

J. C. WILSON.
VOTING MACHINE.
APPLICATION FILED DEC. 21, 1911.
1,038,810.
Patented Sept. 17, 1912.
8 SHEETS—SHEET 2.
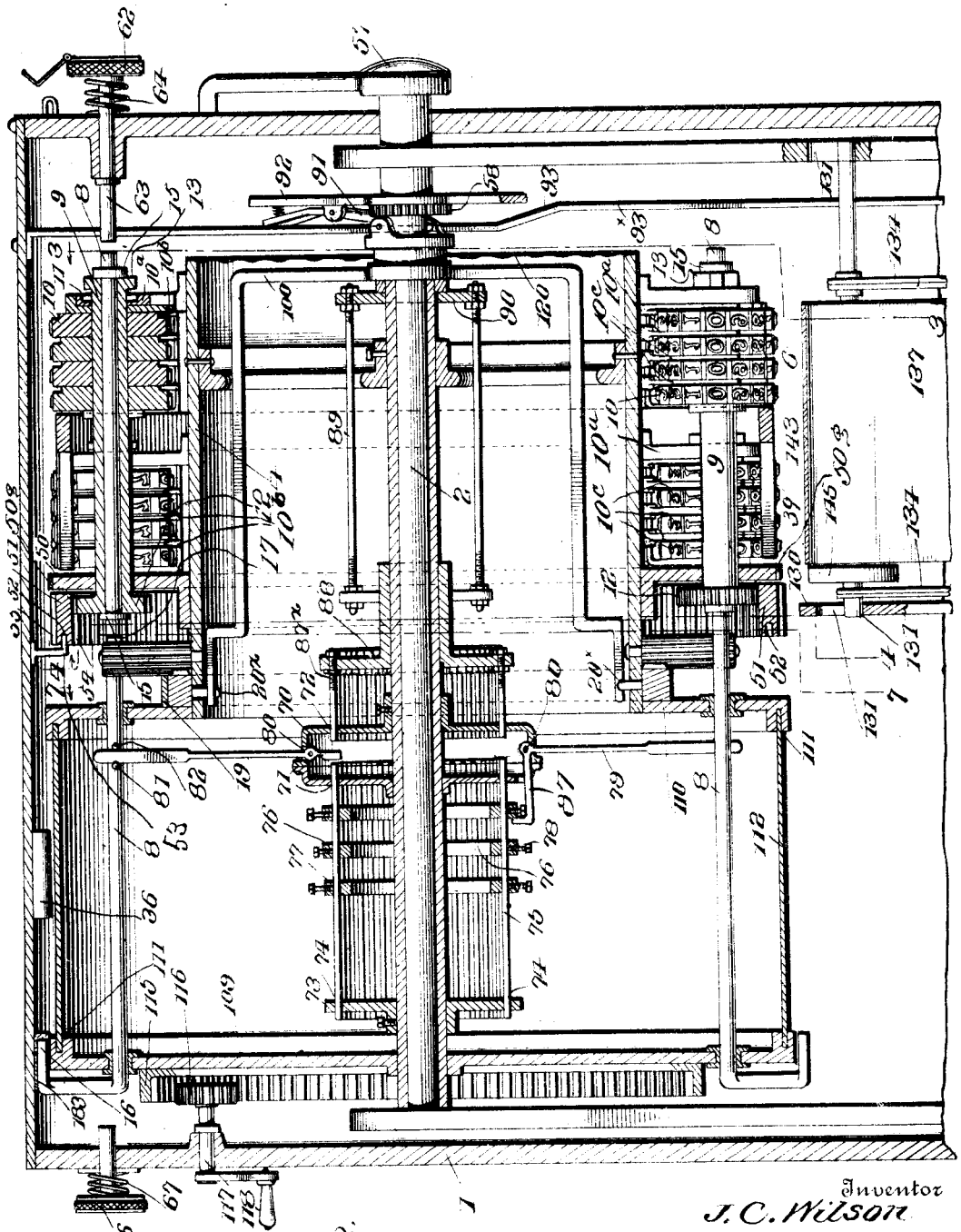
FIG. 2.
Inventor
J. C. Wilson
Witnesses
By
Attorney J. C. WILSON.
VOTING MACHINE.
APPLICATION FILED DEC. 21, 1911.
1,038,810.
Patented Sept. 17, 1912.
8 SHEETS—SHEET 3.
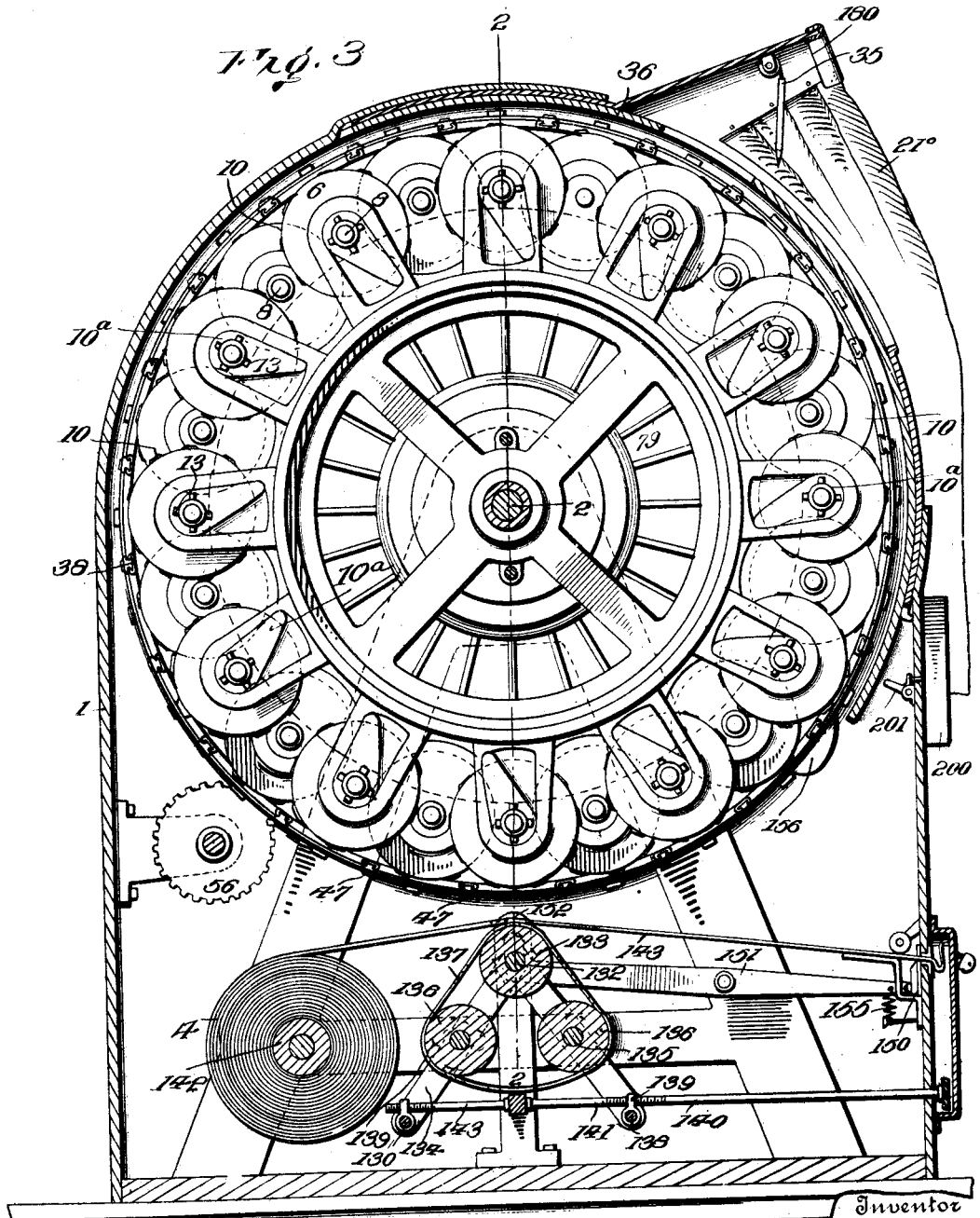
Fig. 3
Witnesses
Inventor
J. C. Wilson
By 
Attorney

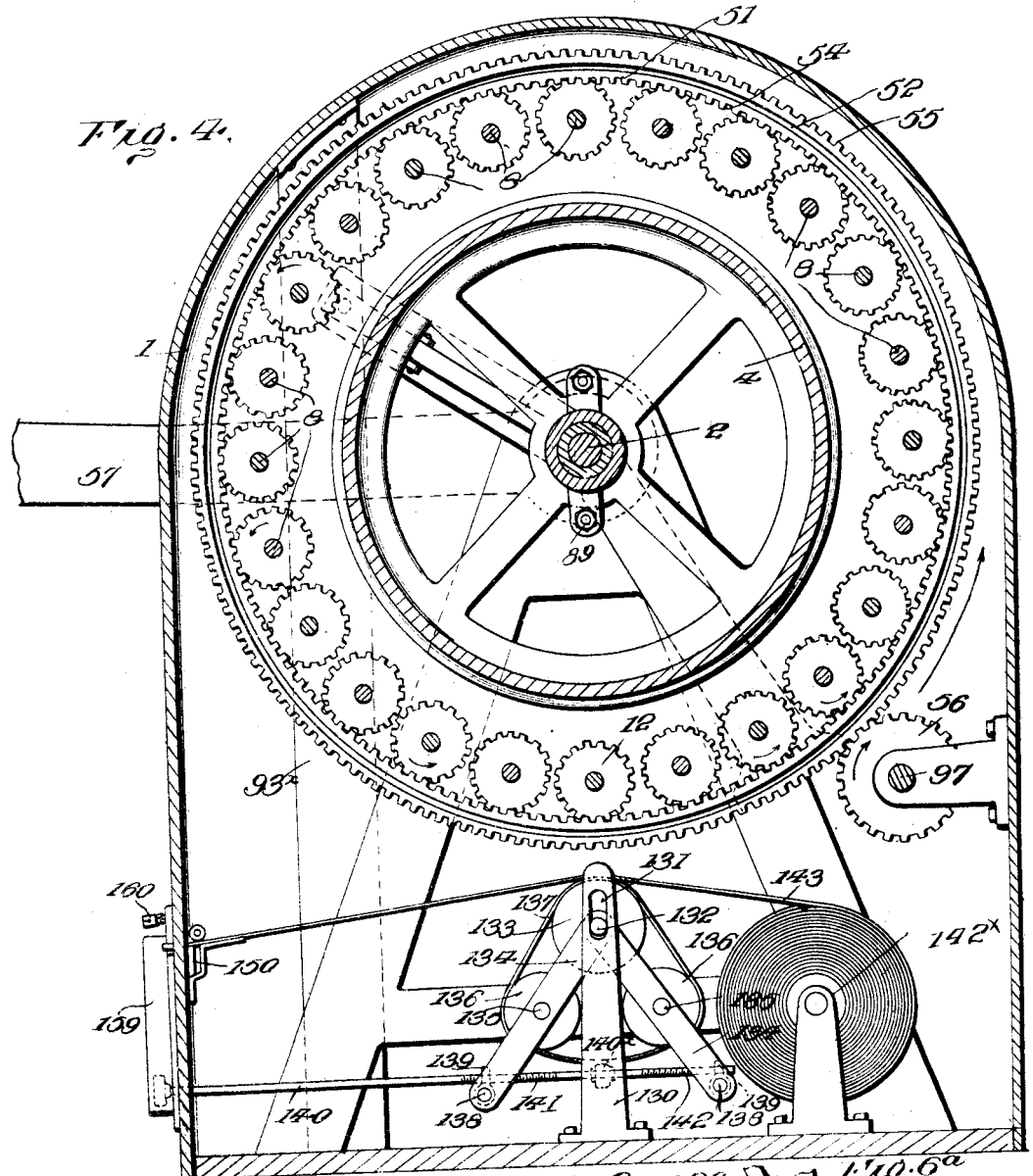

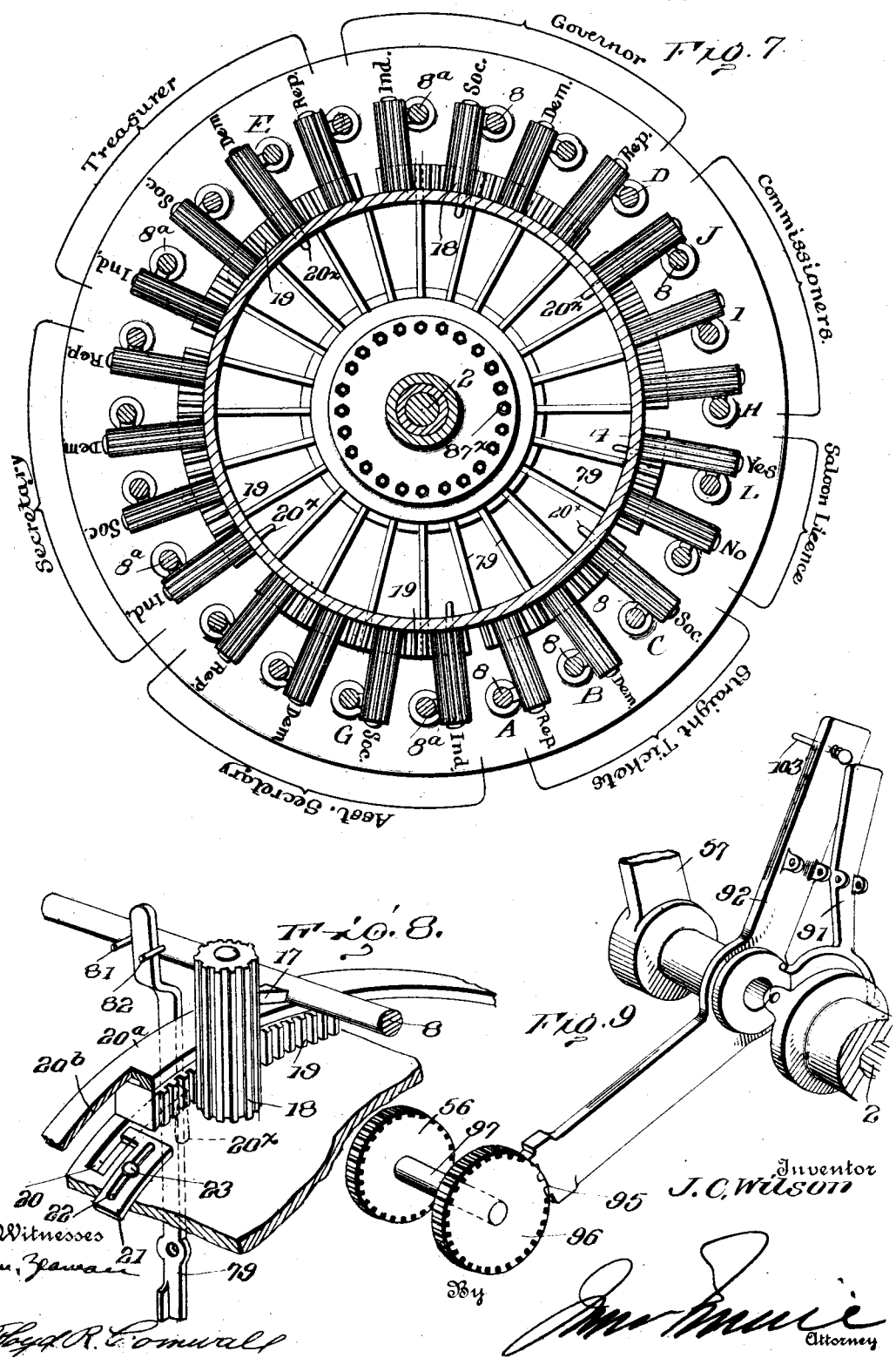

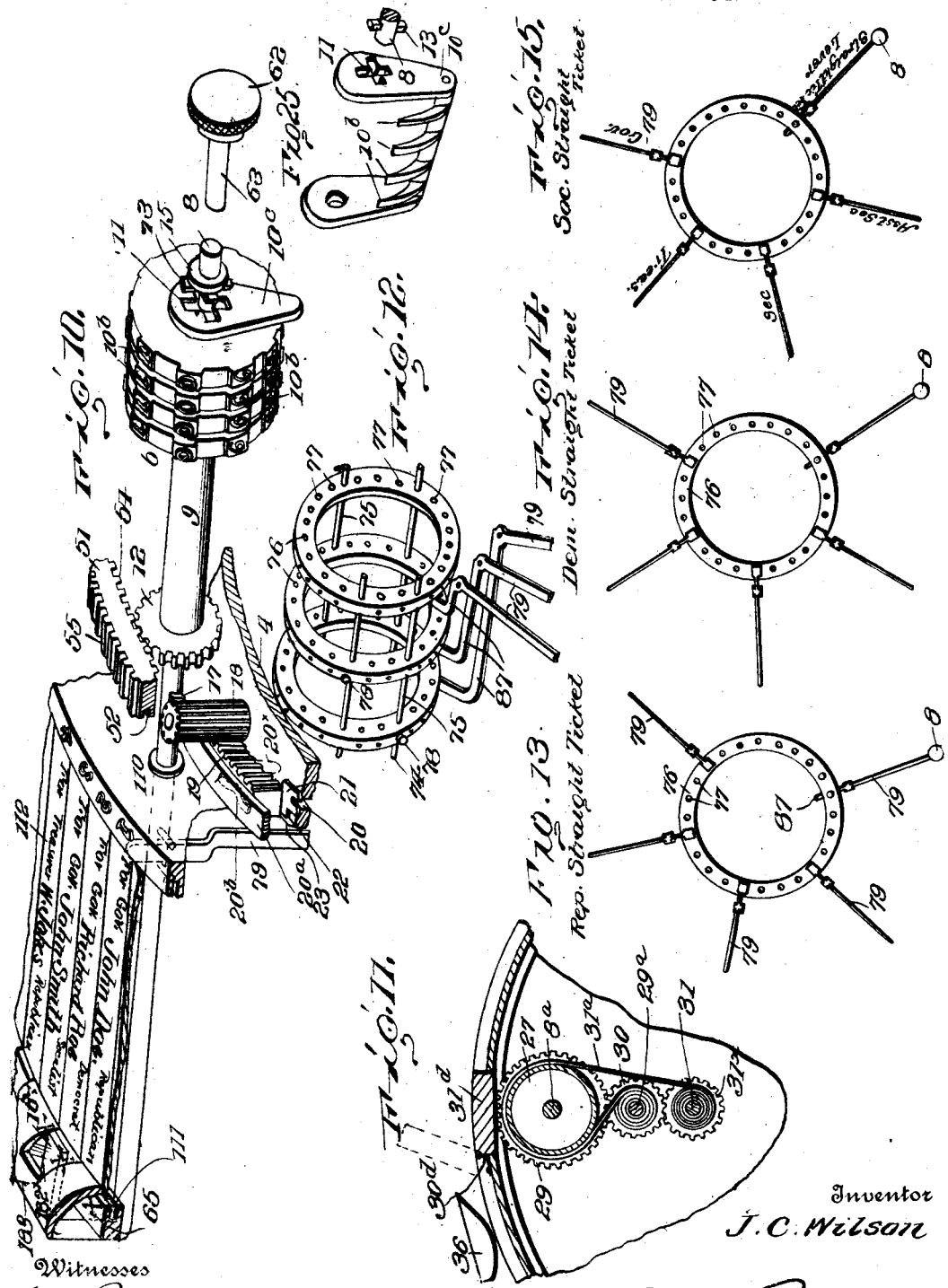

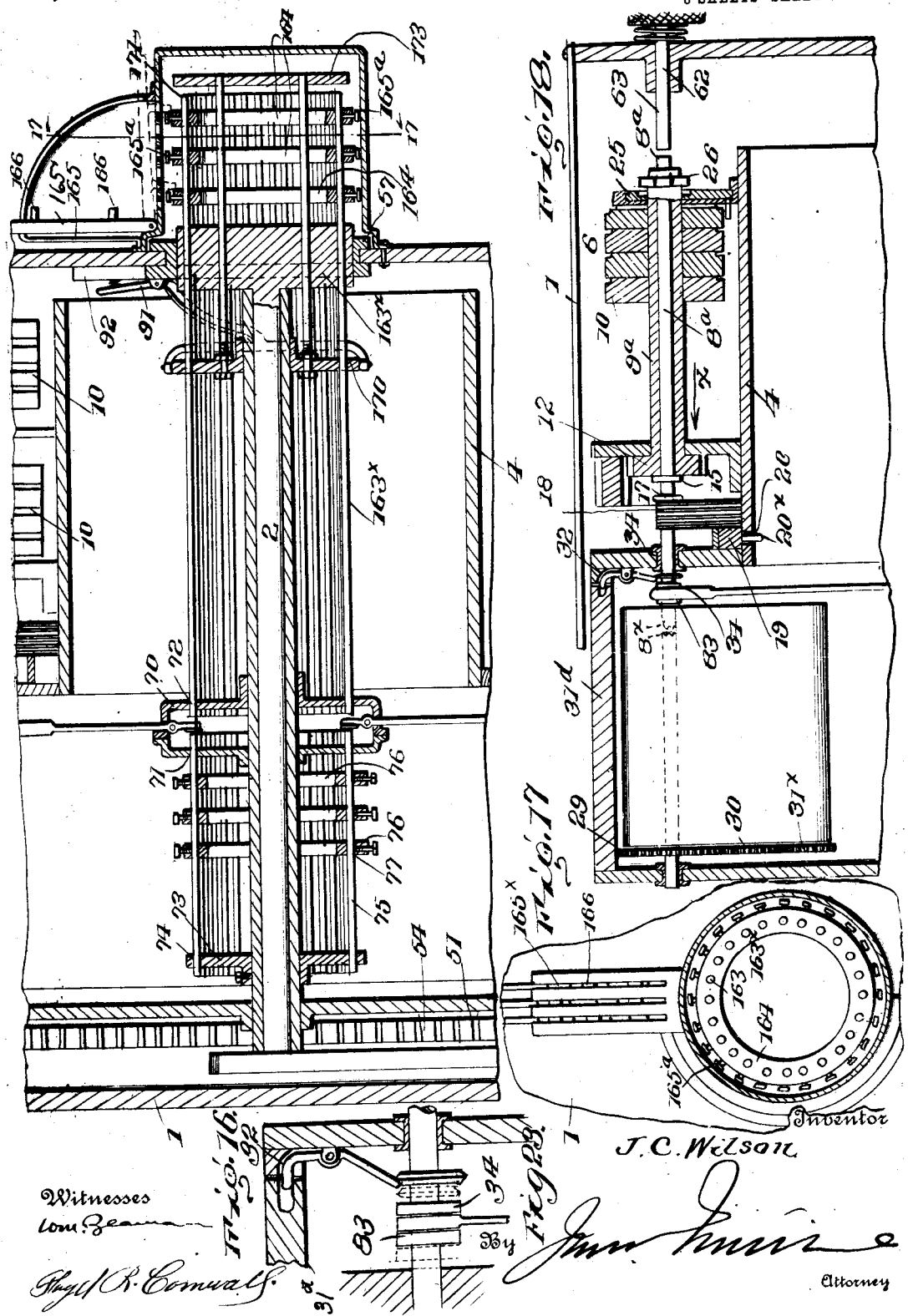

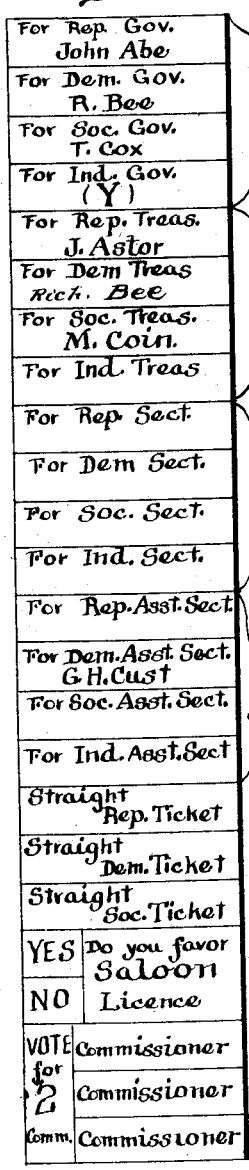
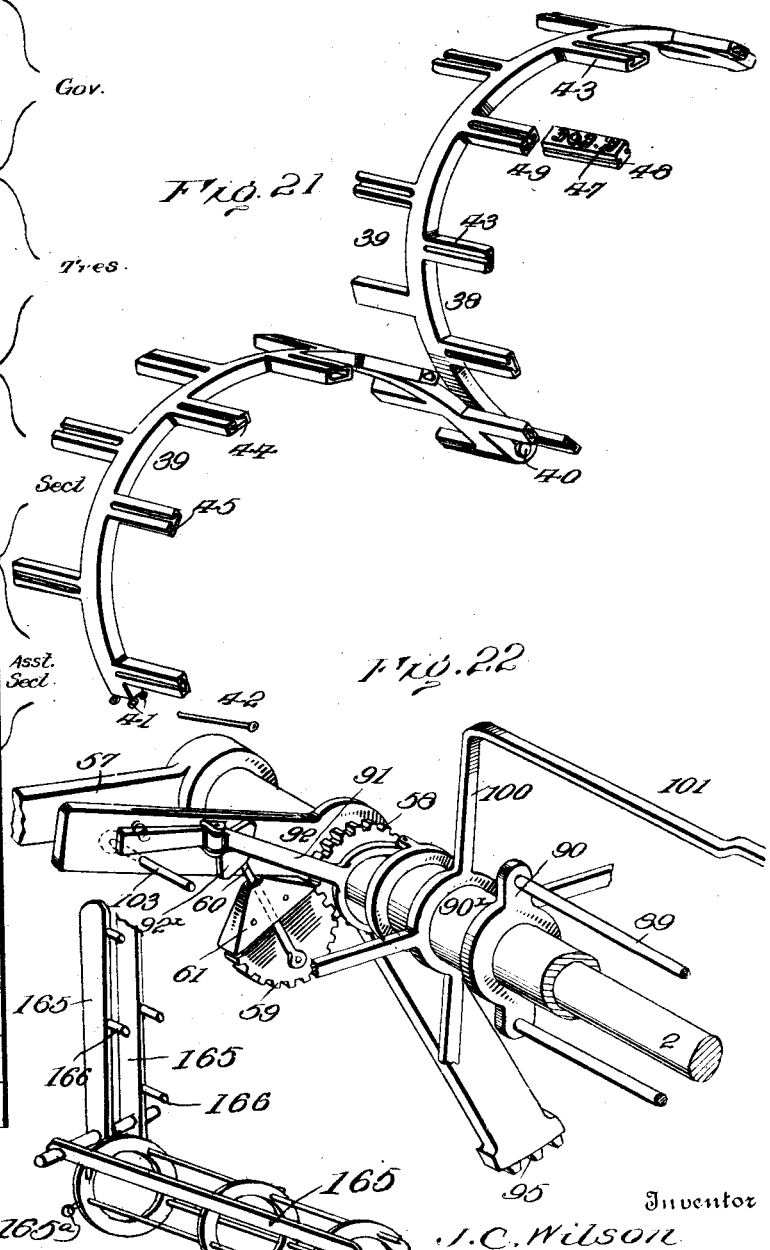

UNITED STATES PATENT OFFICE.

JAMES C. WILSON, OF WASHINGTON, DISTRICT OF COLUMBIA.

VOTING-MACHINE.

1,038,810.　　　　Specification of Letters Patent.　　Patented Sept. 17, 1912.

Application filed December 21, 1911. Serial No. 667,215.

*To all whom it may concern:*

Be it known that I, JAMES C. WILSON, a citizen of the United States, residing at Washington, in the District of Columbia, have invented certain new and useful Improvements in Voting-Machines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to improvements in voting machines.

The object of my invention is to provide mechanism which is placed in operative voting position, and so held by the voter until the vote is cast.

A further object of the invention is to provide improved means for voting a straight party ticket; means to enable a voter to scratch a candidate or candidates of a party; means for adapting the mechanism for voting groups of candidates for a particular office; and means for adapting the mechanism for either the regular elective offices, or for the selection of candidates for primary elections.

The invention also relates to the means employed for selecting a particular candidate, so that if the voter should find a mistake has occurred, correction can be made, and the desired vote cast for the preferred candidate.

My invention also relates to improvements in the means employed for mounting the mechanism so as to permit all the counters and the mechanism associated therewith to freely rotate.

The invention also relates to the particular mechanism employed for effecting the tabulating of the votes cast, and the means for recording the tabulated vote.

The invention also relates to the details of construction and arrangement of parts which will be hereinafter described and particularly pointed out in the claims.

In the drawings: Figure 1 is a perspective view of two of my improved machines to illustrate opposite sides, and showing the mode of operation. Fig. 2 is a vertical section on the line 2—2, of Fig. 3. Fig. 3 is a transverse section on the line 3—3, of Fig. 2. Fig. 4 is a similar view on the line 4—4, of Fig. 2. Fig. 5 is a detail end view of the drum and the means for steadying it. Fig. 6 is a front elevation of the same. Fig. 6ª represents a detail. Fig. 7 is a transverse section on the line 7—7, of Fig. 2. Fig. 8 is a detail perspective view of one of the devices to limit the number of counters which may be operated. Fig. 9 is a detail perspective view of the main supporting shaft, and the levers mounted thereon. Fig. 10 is a detail perspective view of one of the registers and a portion of the drum. Fig. 11 is a detail transverse section of the drum to illustrate a part of the independent voting mechanism. Fig. 12 is a detail perspective view of a part of the straight party vote mechanism. Figs. 13, 14 and 15 are diagrams of the levers for voting straight party tickets. Fig. 16 is a section similar to Fig. 2, but illustrating mechanism which will permit primary voting. Fig. 17 is a detail cross section of the same on the line 17—17 of Fig. 16. Fig. 18 is a vertical section to illustrate the independent voting mechanism. Fig. 19 is a diagram of the strip to indicate the names of the candidates, the offices they seek, and other data relating to the ballot. Fig. 20 is a perspective view of a machine having a much larger capacity than that of the machine previously shown. Fig. 21 is a detail perspective view of a clamp for holding the names of the candidates and other memoranda relating to the ballots. Fig. 22 is a detail perspective view of the main shaft, the levers supported thereon, and the resetting spider. Fig. 23 is an enlarged detail view of the means for locking the cover plate of the independent candidate voting mechanism; Fig. 24 is a detail perspective view of the primary voting mechanism; Fig. 25 is a detail view of the pawls for operating the registers.

1 indicates a casing, and mounted therein is a horizontal shaft 2, to one end of which is secured a handle 57. Rotatively mounted on the shaft 2, is a drum 4, which supports the vote registering mechanism now to be described.

The drum may be said to be divided, for on one end is arranged the names and offices of the candidates, while at the opposite end is the vote tabulating mechanism.

The vote tabulating mechanism comprises a plurality of registers 6, including numbering heads, twenty-four being shown in the drawings, but obviously a greater or less number may be employed according to the number of candidates to be voted for. The registers are all substantially alike, except that those employed for voting a straight party and independent ticket have minor structural details, and for convenience I will describe but one, but will distinguish the details necessary for voting a straight or independent ticket. The term registers as used in the description comprehends the details employed to effect the registration of a vote, and for indicating to a voter whether or not he has selected the proper candidate.

For voting for an individual candidate, each numbering head is mounted on a bar 8, adapted to be reciprocated, and suitably supported in bearings on the drum. Mounted on the bar 8, is a sleeve 9, which carries the numbering disks 10, of any appropriate type, each disk having characters from 0 to 9 inclusive, and the usual mechanism including an operating device $10^a$, provided with pawls $10^b$ for successively rotating said disks to register units, tens, hundreds, etc., and holding pawls $10^c$, as seen in Fig. 12. The operating device $10^a$, is formed on its face with a seat 11, to couple the sleeve 9, with the disks. The sleeve 9, is loose on the rod 8, and is provided at its inner end with a pinion 12, and at or near its outer end is a locking projection 13, designed to coöperate with the seat 11, to effect the operation of the disks. As stated, the sleeve is loose on the rod and while it may revolve, it may also reciprocate with the rod, flanges 15 being provided on the rod to cause the sleeve to reciprocate with it. This mechanism is what may be termed the register setting means 10, employed for each register.

The rod 8, extends entirely through the drum, and at one end it is extended upwardly and over the edge of the periphery of the head 109, to form a lip 16, adjacent the name of a candidate, or other data, as clearly shown in Fig. 10. On one side of the rod 8, is a tooth 17, which engages a pinion 18, mounted on a pin extending from the drum. The pinion 18, meshes with a rack 19, also mounted to move on the periphery of the drum and provided with a lug $20^x$ extending through a slot 20. The rack is mounted in a guide $20^a$, provided at intervals with flat springs $20^b$, to frictionally hold the rack in position. The lug $20^x$ coöperates with an adjustable stop 21, formed with a slot 22, through which passes an adjusting screw 23. The racks 19, are interchangeable and are of different lengths to accommodate different numbers of candidates for a particular office, and the adjustable stops are for the purpose of regulating the movement of such racks which will be more fully set forth in the description of the operation of the machine.

The counter employed for voting an independent ticket is essentially the same as that previously described for voting for an individual candidate, except that both the rod and the sleeve are locked together, and the lip 16, is omitted. One of these registers is shown in detail in Fig. 18, from which it will be seen that the end of the sleeve $9^a$ is formed with a seat 25 to receive a head 26, formed on the rod $8^a$, so that when the latter is forced in the direction of the disks, the head 26, will engage the seat 25, while the projection 13, will also engage the seat 11, in the register setting device, thereby causing the sleeve and rod to revolve in unison when motion is imparted to the pinion 12.

In the end of the drum where the names of the candidates and offices are arranged, the shaft $8^a$, is provided with a roller 27, the periphery of which is opposite an opening 28, in the drum. The roller 27, is rigid on the rod $8^a$, and has a gear wheel 29, which meshes with a gear 30, which in turn meshes with a gear wheel $31^x$ on the shaft of a drum 31. A strip of paper $31^a$ is wound on the drum 31, and passes over roller 27, and is wound on the drum $29^a$, so that upon movement of the shaft $8^a$, the strip will be advanced to present a clean surface for the next vote. The rod $8^a$, is formed in sections, the adjacent ends thereof having clutching faces $8^x$, so that the roller 27, cannot be turned until the surface of the paper strip is exposed.

Secured to the drum by spring hinges $30^d$, is a cover plate $31^d$, for normally closing the opening 28. The cover plate is held in closed position by a pivoted latch 32, the lower end of which is seated in the path of movement of a beveled flange 34, (shown in Fig. 18) on the rod $8^a$, so that upon movement of the latter in the direction of the arrow $x$ in Fig. 18, the flange 34, will strike the latch and disengage its outer end from the cover plate $31^d$ and the latter will automatically open and expose the surface of the paper on the roller 27. The beveled flange 34, will pass by the end of the lever 32, and free the same when the register is operated, so that when the voter desires to close the door, the latch will be in position to snap in place in its seat. A pencil 35 (shown in Fig. 3) is provided in the casing to enable the voter to indicate on the paper his choice of independent candidates. When the drum is turned, the cover plate contacts with a cam surface 36, on the casing, so that when the voter performs the final operation to effect the casting of his ballot, the drum revolves, and the cover plate will be automatically closed.

A clamp 38, is fitted around the register, and comprises two sections 39—39 hinged at 40, and at their free ends, the sections have eyes 41, for a pin 42, to lock the clamp in position. Extending from opposite sides of each section are name plate holders 43, each formed with a socket 44, and spaced flanges 45. The holders on one side of the clamp are disposed intermediate those on the opposite side of the clamp, so as to be located between adjacent registers. This arrangement is essential, owing to the fact that the registers are arranged in two annular rows on the drum, the registers in one annular row being disposed intermediate those of the adjacent annular row. By this disposition of the registers, it enables me to include a large number of candidates in a comparatively small space.

Fitting in each name plate holder is a name plate 47, formed with side grooves 48, and on its upper surface with the name of a candidate, indicated at 49. The name plates fit between the adjacent heads so that when the votes are finally recorded by mechanism to be described, the candidate name will appear in one line, the number of votes cast will be directly under it.

Fitting over the series of pinions 12, and held in position against an annular flange 50, of the drum, is a toothed ring 51, by means of which the sleeves 9 and 9ª are rotated to operate the counting disks. For convenience in holding the ring 51 in position, it is formed with an annular groove 52 which fits a track 53. The track may be in the form of a ring, or in sections, according to the desires of the manufacturer, and the style of the machine. The ring is further provided with internal gear teeth 54, which mesh with the pinions 12, and external gear teeth 55, which mesh with a gear 56 as seen in Fig. 4. The width of the toothed ring is greater than the width of the pinions 12, so that when the latter are reciprocated they will at all times be in mesh with the internal teeth 55.

On the end of the shaft 2, outside the casing is the handle 57, to set the mechanism in operative position, and to operate the mechanism to properly register the ballots, and at the same time restore the parts to normal position.

The rods 8 and 8ª are reciprocated in one direction by a key 62, located in convenient reach of the voter, on the left hand side of the machine. A stem 63, projects inwardly from the key 62, so that when a particular candidate is to be voted, and the key is pressed in, it will force the rod inwardly, and set a register in operative position. The key 62, is returned to its normal position by a spring 64, this movement being wholly independent of the movement of the rod. When the rod 8, is moved by the key, the lip 16, is removed from the edge of the drum, and exposes a character such for instance as x, indicated at 65, in Fig. 2 to clearly indicate to the voter that he is voting for the candidate whose name appears opposite.

If the voter finds he has made a mistake in the selection of his candidate and desires to correct the error, a key 66, is provided on the right hand side of the machine in alinement with the key 62. This key 66, is maintained in its normal position by a spring 67, and by pressing it in against the tension of the spring, the rod 8, if it has previously been operated upon by the key 62, can be returned to its normal position, and the voter may rotate the drum and select another candidate.

For voting a straight party ticket, special mechanism is provided, to coöperate with the registers. Mounted on the hub of the drum is a hollow casting 70, formed in opposite walls with alined openings, 71 and 72. Also on the hub of the drum is fastened a disk 73, formed with openings 74, corresponding with the number of the openings 71 (there being one opening for each register). Mounted to slide in the openings 71 and 74, are rods 75, which may be secured to rings 76, provided with openings 77, and set screws 78. Each ring 76, represents a party, while each rod represents a particular candidate, or a party. If a certain number of candidates of a party representing the offices sought are to be voted by a single operation of one of the rods 8, the rods 75, representing these candidates will be fastened to the ring representing that particular party, by tightening the set screws 78. Hence, when a ring 76, is moved, all the rods 75, secured thereto will be moved with it.

Between the rods 75, and the rods 8, are interposed levers 79, pivoted to the casting at 80, the inner end of each of said levers terminating in alinement with a rod 75. The upper end of each lever 79, fits closely against the rods 8, and operates when the latter are operated. Projecting outwardly from each rod 8, used for voting for individual candidates are two lugs 81, and 82, between which fit the upper end of a lever 79, whereby motion is imparted to the lever upon any sliding movement being given to either a rod 8 or 75. As before explained the rods 8, only have a reciprocating movement, but the rods 8ª, representing the independent votes have a reciprocating and rotary motion, hence it is necessary to provide the latter with a flange 83 spaced from the flange 34, between which the lever 79, operated to vote for independent candidates fits, as shown in Fig. 18. This is quite necessary, due to the fact that it is essential that each lever be maintained in relation to its rod, even during its period of rotation. The levers 79 which coöperate with the rods 8, which are connected with the registers for voting straight party ballots, are each provided with a finger 87, the end of which engages behind one of the rings 76, so as to move the latter and the rods connected therewith, as clearly shown in Fig. 12.

It is to be distinctly understood that the rods 75, and the rings 76, are only operated when a voter is casting a straight party ticket, although the levers 79, coöperating with the rods 8, will be rocked upon moving said rods. Furthermore, if a straight ticket is voted, and a particular candidate or candidates should be "scratched," the movement of the lever 79, would return all the rods 75, and the ring 76, to which they are attached, as well as the rod 8, of the counter. But this movement in no wise affects the vote cast for the other candidates of the party, as the return movement of the rods 75, is in no way transmitted to the levers 79.

After a voter has cast his ballot, the handle 57, is dropped and the mechanism now to be described automatically returns the parts to normal position. Fitting in the openings 72, in the casting 70, are pins $87^x$, (one for each candidate) secured at one end to a sliding collar 88, mounted on the hub of the drum, and connected by rods 89, or similar devices with a collar 90. The collar 90 is adjacent a sleeve on which is pivoted a lever 91, which in turn is pivoted to an arm 92, secured on the shaft 2. The free end of the lever 91, operates in the path of a cam 93, on a standard $93^x$, the cam turning said lever on its pivot, and thereby causes the collar 90 to be forced inwardly toward the casting 70. This movement is so timed that it does not take place until all the set registers have been operated, and other parts returned to normal position. However, when the pins $87^x$ have been forced through the opening 72, they all contact with the levers 79, of the counters previously operated, and return the rods 8 and $8^a$, and the rods 75, and ring 76, to their normal position, to reset the machine for the next operation. Prior to the time of resetting the parts as just described, the toothed ring 51, was operated to turn the sleeves 9 and $9^a$ to add the votes cast. This operation is accomplished by providing the end of the arm 92, with a rack 95, which in the movement of the shaft 2, engages a pinion 96, fastened on a shaft 97, mounted in bearing, secured to the casing. On the opposite end of the shaft 97, is the pinion 56, which meshes with the external teeth on the ring 51, which as previously explained rotates the pinions 12. The parts are so proportioned that the movement of the shaft 97, will rotate the pinions sufficient only to bring but one number on the disk into position, which will of course represent but one vote for that particular candidate.

On the shaft 2, is a pinion 58, which meshes with a pinion 59, mounted on the casing. The pinion 59, has pivoted to it a plunger 60, which is guided in a tapered housing 61, the upper end of the plunger being located in the path of movement of a cam $92^x$ so that the latter will contact with said plunger and restore the drum to a zero position. The housing 61, is mounted on a bracket $61^g$, extending from the standard $93^a$, and in the housing the pinion 59 is journaled. The movement of the handle also performs another important function, after the disks have been operated to count the ballots cast. It is true that when the rods 8, have been returned to their normal position, the racks 19, would be moved, but with the mechanism as I have arranged it, it is possible to vote for two or more candidates for as many offices. For instance, if, say two representatives of a particular party are to be elected for Congress, and there should be say four candidates, then two rods 8, would necessarily have to be operated, but in returning the rods to their normal position, through the instrumentality of the levers 79, obviously the rack 19, with which the pinions 18 mesh, would only move a distance equal to the movement imparted by the tooth 17. Hence the rack would be improperly positioned for the next voter, and the latter would be deprived of his right to vote for the two candidates. To meet this contingency, I mount on the sleeve 90, a spider 100, the arms 101 of which extend close to the inner surface of the drum and in the path of the studs $20^x$. When the lever 57, is lowered, it also lowers the arm 92, and it contacts with the plunger 60, and returns the drum to normal position. The arm 92, has mounted thereon a spring pin 103, which contacts with a cam 104 on the standard 93, and forces the pin inwardly to engage one of the arms of the spider to rest the lugs $20^x$. This action, however, does not take place until after the registers have been operated and the other parts of the mechanism have been reset, and is only intended to return the racks 19, to their normal position when groups of candidates have been voted for. While this movement will impart motion to such of the pinions 18, of a group where double voting is permissible, it is to be borne in mind that the teeth 17, are out of mesh with said pinions, consequently no motion will be imparted to the rods 8.

The end of the drum on which the names of the candidates and the offices they seek is indicated, is composed of two disks or heads 109 and 110, each having a groove 111, to receive a sheet or sheets 112, with the necessary data printed thereon. For every rod 8 and $8^a$ there will be printed on the sheet 112, the office and the name of the candidate, or the party vote. Of course in the case of an independent ticket, the cover plate is provided as previously described, there being preferably a cover plate for an independent candidate for each party, but others may be provided if desired. In addition to the name of the candidate and a memorandum of the office the periphery of the disk 110 is provided with raised numerals consecutively arranged to indicate by number the various candidates, so that for an ignorant, or blind, voter, he may be told in advance what number represents a certain candidate or party, and cast his ballot accordingly.

On the disk 109, is fastened a toothed ring 115, with which a pinion 116 meshes. The pinion is mounted on a shaft 117, suitably supported in the casing, and extends through the same, and is provided with a handle 118. This feature is designed for the purpose of rotating the drum to enable a voter to bring the name on the sheet 112, into view, and set the drum in position so as to vote the desired candidate.

To steady the mechanism during the period of voting, and to insure the stopping of the drum in the proper place, a plurality of depressions 120, are formed on one edge of the drum, there being one depression for each register, and a spring 121, coöperates with said depressions. The spring 121, is fastened to the standard 93ˣ, and is provided with a detent to fit in the grooves as shown in Fig. 5. To retard the movement of the drum when the handle is lowered, in bringing the mechanism to normal position and to insure its stopping at a zero point, a leaf spring 123, is located adjacent the spring 121, but on the opposite side of the standard 93ˣ. Extending through the latter and impinging on the springs 121 and 123, is a pin 124. The spring 123, is arranged in the path of movement of the arm 92, and when the latter is lowered, and at about the time it reaches its lowest point, it contacts with the spring 123, and forces the pin 124, against the spring 121, and into one of the depressions 120, and effectually holds the drum in fixed position. The spring 123 inclines in the direction of the path of movement of the arm 92, so that as the latter is lowered, pressure on the spring is gradual, hence the rotary movement of the drum is gradually retarded, so that by the time the greatest pressure on the pin 124 occurs, the movement of the drum is very slight, and the detent readily holds it in position. But the handle 57, may be moved past the plane of the pin 124, so that the drum is free to be rotated.

After the votes have all been cast, the precinct officers lock the key to prohibit further voting and it only remains to make a tabulated record of the number of votes polled. This operation is accomplished by a printing mechanism located in the casing, and controlled by the precinct officer. Under the drum are standards 130, each formed near its upper end with a slot 131. Extending through the slots is a shaft 132 and mounted thereon between the standards is a roller 133, and at opposite ends of said shaft are depending arms 134. In the arms are mounted rods 135, which support rollers 136, around which and the roller 133, passes an inking ribbon 137. Pivotally mounted in the lower ends of the arms 134, are cross rods 138, each rod connecting the arms 134, on opposite sides of the rolls. Projecting from each rod is an ear 139, one of which is provided with an opening having right hand threads, while the other ear is formed with an opening having left hand threads. Extending through the threaded openings in the ears and a bearing 140ˣ, is a rod 140, provided with right and left hand threads 141, and 142, the outer end of said rod terminating in a knurled head located on the outside of the casing.

In the rear of the standards 130, and mounted in suitable standards is a roller 142ˣ, on which is wound a strip of paper 143. This paper passes between the registers and the ribbon, and thence through an opening in the front of the casing. On one end of the roller 133, is a resilient band 145, which is in alinement with the flange 50, of the drum. The periphery of the flange 50, is also provided with a resilient band 50ˢ, and at the proper time is brought into frictional contact with the resilient band 145.

During the time the machine is used for voting purposes, the roller or plate 133, is lowered to keep the paper out of contact with the registers, as shown in Fig. 3. But when it is desired to obtain a printed record of the votes cast, the rod 140, is turned, which draws the lower ends of the arms 134 together and thereby elevates the roller 133 until the paper contacts with the printing surfaces of the registers. Then by turning the handle 118, the drum is revolved which by reason of the frictional contact with the roller 133, the latter is revolved and the paper is fed through the opening in the casing. Of course, as the disks and the name plates pass over the paper, the name of each candidate, the number of party votes, and independent votes cast, are printed on the strip.

In order that any number of separate strips may be printed for distribution, I provide a cutting device located adjacent the opening in the casing through which the paper passes. This device comprises a pivoted knife 150, connected to the free end of which is a pivoted lever 151, one end of which is formed with a slot to receive the shaft 132. The end 152 (shown in Fig. 3) of the lever 151, is adapted to be raised and lowered with the printing roller 133, so as to bring it in the path of movement of a cam 156 on the drum, a spring 155 (shown in Fig. 3) serving to return the knife and the lever to normal position. Upon each revolution of the drum the knife is raised and the strip is severed. Each severed strip has printed on it the complete ballot as cast during the voting period.

The end of the rod 140, and the opening in the casing through which the paper strip passes are protected by a hinged door 159, locked as at 160. This door is controlled by the precinct officers, and is not to be opened at any time while the voting is going on.

The mechanism thus far described, is arranged for what may be termed regular elections, where individual candidates for various offices are to be selected, but for primary elections as the conditions are different, the voting means must also be rearranged. My improved mechanism may readily be adapted for such a contingency and I have therefore devised means, whereby either regular or primary voting may take place with a single machine, but of course at different times. In lieu of the short pins 87$^x$, I provide longer pins 163, (Fig. 16) which in addition to being supported in the casting 70, are supported in a hub 163$^x$, on shaft 2, and extend beyond the casing. Coöperating with these long pins are rings 164, one ring being provided for each party, and each ring being secured by set screws 165$^a$ to the pins 163, representing candidates of a particular party for the various offices. For each ring there is a locking lever 165$^x$, (Figs. 16 and 17) having a plurality of openings to receive studs 166, to form different combinations according to the number of parties and the number of candidates for the offices. For instance, if a voter approaches the machine to cast a vote in a primary election, the precinct officers will inquire which party he desires to vote, then by throwing down one of the levers 165$^x$, the studs 166 fall behind the rings 164, representing the candidates of the two other parties, and as there is no stud for the remaining ring, or in other words, the ring representing the party the voter desires to ballot for, the registers representing the candidate of such party are unlocked. When one of the rods 8 or 8$^a$ is operated, the lever 79, will force the pins 163, and its ring outwardly, thereby permitting of voting with the registers in the same manner as previously described. The voter having cast his ballot, the handle 57, which in this instance is mounted on the hub 163$^x$, and operates as before described, except it acts to move a flange 170 laterally. This flange is provided with rods 171, which extend through the hub 163$^x$ and beyond the rings 164, and at their outer ends they are connected to a plate 173, located in front of the long pins 163. Hence, as the flange 170 is moved by the handle, all the pins 163, are returned to normal position, and operate on such of the levers 79, as were moved in casting the ballots. The lever 165$^x$, is returned to its normal position by the precinct officers, and the mechanism is ready for the next voter.

For convenience in obtaining a comprehensive understanding of my invention, I have shown a machine having but twenty-four rods 8 and 8$^a$, and they have been grouped so as to vote for such officers as governor, treasurer, secretary, assistant secretary, commissioners, yes or no for license. For these offices, from governor to assistant secretary inclusive, there will be four candidates, one representing a Democrat, one a Republican, one a Socialist, and one an independent candidate. Three of the rods 8 are for the purpose of voting straight party tickets, (see Fig. 7) one for each of the parties represented, while the three remaining rods are grouped so that two of the three commissioners may be voted for.

The diagrammatic views illustrated in Figs. 13, 14, and 15, show the disposition of the levers 79, for candidates of the three particular parties, so as to readily appreciate how a party vote may be cast. The mechanism is first set in normal position. That is, all the disks are turned back to zero, and the sheets bearing the names of the offices and the candidates are inserted in the grooves 111, and the printing mechanism is positioned as indicated in Fig. 3, so as to prevent printing of the record during the voting operation. The machine is now ready for voting, but in order to prove that the registers are all at zero to avoid any irregularity, the printing mechanism is set in position and the drum is rotated and a printed record is made to show conclusively that all registers are properly set. A voter approaches the machine and elevates the handle 57, and supports the same on his shoulder. The handle is attached to a frame formed with a sight opening 180, said frame normally covering the opening in the casing when the handle is down. When the handle is elevated the voter can see a portion of the surface of the sheet 112, to enable him to select his candidate, and as the opening in the frame is of about the size of the voter's head, he alone can see the names of the candidates and therefore secrecy in voting observed. The raising of the handle does nothing more than to free certain parts of the mechanism to permit of the operation of the key, for were the handle lowered the pins 87 could not be moved, hence a vote could not be cast. The voter having raised the lever, and as the latter is supported on the shoulder, his hands are free to manipulate the mechanism. With the right hand he turns the handle 118, which revolves the drum, until a particular candidate comes opposite an opening 182˟ in a flange 183, adjacent the edge of the disk 109, the detent 124˟, fitting in one of the depressions 120, holds the drum in proper position, so as to properly locate the rod 8 or 8ᵃ, as the case may be, opposite the stem of the key 62.

Suppose the voter is a Republican, and he desires to vote a straight Republican Party ticket. He, therefore, rotates the drum until he reaches the space marked on the sheet 112 "straight Republican ticket" and sees to it that this space is opposite the opening 182˟. Then with the finger of the left hand key 62 is pressed, which moves the rod 8, indicated at A, in Fig. 7. The voter removes his finger, and all that is necessary to complete the voting operation is to lower the handle. When the rod 8, indicated at A (Fig. 7), was forced in, the lip 16, uncovered the *x* character on the head 109, (Fig. 10) opposite the candidate's name on the sheet, indicating clearly to the voter that the key he pressed represents his choice of candidates. When the rod was moved it also rocked the lever 79 coupled therewith and which has the extension 87. The latter fits behind the first ring 76, marked in Fig. 13, "Republican". To this ring the rods 75, representing one Republican candidate for each office are secured. There would be locked to this ring, four rods representing governor, treasurer, secretary, and assistant secretary. These rods are all moved simultaneously, and their inner ends strike the levers 79, in the casting 70, and correspondingly slide the rods 8, with which they are connected. Hence, by pressing one key 62, four registers set to be operated, for it must be borne in mind that when the rods 8 are moved, the projections 13, are forced into the seats 11 and lock the disks in position to be operated to record the votes. It is to be understood at this point that the racks 19, (Fig. 7) for each office voted, can only move the distance equal to the movement imparted by the tooth 17, so that a voter can only vote for one candidate in each office. The voter having cast a straight party ballot, it will be impossible for him to repeat, for all the keys representing the remainder of the candidates are locked, and although he is free to turn the drum as much as he may like, he cannot vote for another candidate, for any of the offices in the group represented by the straight party ticket, but he may if he desires "scratch" a candidate. Assume the voter is satisfied with his selection of the party vote, it only remains for him to operate the set register. As he leaves the machine, the handle 57 drops of its own weight and in so doing it rotates the shaft 2, and the segment 95, engages the pinion and rotates the toothed ring 51, which in turn revolves the pinions 12, and operates the register set by the movement of the rods 8. This motion of course operates the disk or disks 10, and registers the votes cast for the respective candidates. As the handle continues to drop, it will contact with the plunger 61, and return the drum to normal position, or in other words, in position so that the name of the first candidate in the group of those for the highest office will be opposite the opening 182˟. During the time between the partial rotation of the ring 51, and the final stopping of the rotation of the drum, the lever 91, will contact with the cam 93, and thereby move the pins 87, and restore all the levers 79, which represent the candidates previously voted to normal position.

To vote a straight party ticket, for the Democratic or Socialist candidates, precisely the same operation is performed. The levers 79, are arranged as shown in Figs. 14 and 15, and the corresponding rods 8 are located at B and C in Fig. 7, respectively.

Suppose the voter desired to vote a straight party ticket, with perhaps the exception of one or two candidates, one being used to illustrate the operation. This would involve "scratching" a party candidate, and it can be readily and conveniently accomplished with my improved mechanism. Let it be supposed that the whole ticket is arranged as shown in Fig. 19 and that the Republican straight party key, indicated at A, in Fig. 7, had to be pressed, as previously described, and John Abe, the Republican candidate for governor is to be "scratched", and the vote is to be cast for Richard Bee, the Democratic candidate for governor. The voter rotates the drum until the name of John Abe appears in alinement with the opening 182˟, and as the rod 8, representing this candidate was forced to the left by the voting of the straight party ticket, the end of said rod will be in close proximity to the stem of the key 67. Now by pressing key 67, the rod 8 representing the Republican governor, John Abe will be returned to normal position, which movement also operates the lever 79, connected therewith. The lever 79, of this rod 8 will act on the end of the rod 75, opposite thereto, and will return all the bars in the series connected to the Republican ring 76. As the ring is retracted it operates on the finger 87, and returns the rod 8, indicated at A, and representing the Republican straight party ticket, which movement also resets the racks 19, which coöperate with the rods of the Republican governor and the straight Republican candidate. Under these circumstances the counters of three of the candidates of the Republican Party ticket are undisturbed, and could be voted if desired. But it is the intention of the voter to cast a ballot for the Democratic governor. He will, therefore, turn the handle 118 until the name of Richard Bee comes in alinement with the opening 182ˣ, then the key 62, is pressed and the sleeve 9, set the register, in the same manner as previously described. As the operation locks all the offices against repeating, and as there is nothing further to do in the selection of the candidates, the voter drops the lever 57, and the votes for the respective candidates are registered.

The independent ballot is cast very much the same as the ballot for the party candidate, and may be voted in connection with a straight party vote in the same manner described in connection with the scratching of the Republican governor, as there is an independent register for each office, consequently a pinion 18, to coöperate with a rod 8ᵃ is arranged for each rack of a particular office.

To cast a vote for an independent candidate, the voter will turn the handle 118, and rotate the drum until for instance the independent cover marked "y" which indicates an independent candidate for governor, comes in alinement with the opening 182ˣ. The key 62, is pressed and the rod 8ˣ, is forced in, which first locks the rod to the sleeve 9ˣ and upon further movement the sleeve is locked to the register. The movement of the rod 8ᵃ also disengages the spring latch 32, and the door 31, automatically springs open and exposes the paper 112. Further movement of the rod 8ᵃ connects the clutch faces 8ˣ and locks the roll 27, thereto. The voter can now reach for the pencil 35, and write the name of his independent candidate on the strip of paper. When the drum is turned again, the door contacts with the cam 36, and is automatically closed. But if the voter desires, he can close the door after he has made the memorandum, but cannot again vote, as it necessitates further movement of the drum by the handle to operate the counter. Furthermore as the section of the rod 8ᵃ on which the roller 27 is mounted does not extend to the key 66, the voter cannot reset the mechanism and duplicate his vote. The rods 8ᵃ can only be returned to normal position when the handle 57 is lowered, consequently the independent vote having been cast, the registers of the other candidates for this office are locked. This same operation is repeated for independent votes for each office, and each vote is registered, and each register setting mechanism is returned to normal position in the same manner as previously described. But in registering the number of the independent votes for a particular office, another operation takes place. When the pinion 12 is revolved by the ring 51, it turns the rod 8ᵃ, which, through the medium of the gearing on the rolls 27, 29ˣ, and 51, turns the paper strip, so as to present a blank space for the next voter. When the rod 8ˣ, is returned to normal position, the registers and the roll 27, are released, and in no instance can they be connected except by pressing the key 67. As the rods 8ᵃ are rotated the teeth 17, instead of being projections as shown on the rods 8, are annular flanges one of which is clearly shown in Fig. 18. Consequently, when a rod 8ᵃ is turned, the flange will always be in position to engage the pinion 18.

If the voter desires to cast his ballot for a candidate from different parties, the straight party ticket need not be operated. For instance, let it be supposed that the voter desires to vote for John Abe, the Republican governor, Richard Bee the Democratic treasurer, and independent candidate for secretary, and G. H. Cust, Socialist for assistant secretary. Under these circumstances, the voter raises the lever 57, then rotates the drum until the name of John Abe comes opposite the opening 182ˣ, and then presses the key 67, and operates the rod 8, indicated at D in Fig. 7. The key 67, is released and the drum is again turned until the name of Richard Bee comes opposite the opening 182ˣ, the rod 8 of which is indicated in Fig. 7, at E, and the key 67, is again pressed. The key is again released and the drum is turned until the independent door of the secretary is opposite opening 182ˣ, the rod 8ᵃ of which is indicated in Fig. 7, at F, and then the key 67, is pressed, then released, and the pencil vote is made, and the drum is turned to bring the name of G. H. Cust opposite the opening 182ˣ, the rod 8 of which is indicated in Fig. 7, at G, and the key 67, is pressed and released as before. The selection of candidates locks the machine against repeating, in the same manner as when voting for a straight ticket, but the rods 75, are not operated, although the levers 79, swing so as to place them in position to be struck by the resetting pins 87. After the ballot is cast, the lever is lowered and the registers are operated to tabulate the votes.

To illustrate the manner of voting for a group of three candidates for a particular office, I have used three registers, two of which may be operated to ballot for two candidates out of the three. It is, however, to be distinctly understood that I merely show three candidates in the group to simplify the description, and that any number in a group may be voted, depending altogether on the size of the machine and the number of the candidates. Let it be understood that three candidates are in the field for commissioner, and that two of the three are to be elected. The rack 19, under these conditions must be permitted to move twice the distance of any of the other racks, heretofore referred to in the description of the operation of my machine. Therefore, the stop 24, will be adjusted accordingly so that the stud 20ˣ, when moved twice, will come up against said top and preclude voting the third candidate. This having been done, any two of the rods 8, indicated at H, I, J, in Fig. 7, may be operated, but it is to be understood that each of said two rods are brought separately in alinement with the key 67. If the two registers are operated, it obviously locks out the third, so that repeating is impossible. After the ballot is cast, the registers are operated when the handle is lowered, and in all respects with the exception of the increased space for the movement of the rack, the mechanism is identical with that of the others used for voting for an individual candidate.

To further illustrate how the mechanism may be employed for voting "yes" or "no" on a public question, the sheet or sheets 112, have indicated thereon for instance the following data: "Do you favor saloon license", and opposite thereto on different lines the words "Yes" or "No". The rods 8, representing these questions are indicated in Fig. 7 at K and L, and a rack 19, is common to both of them. Hence, if one of the rods should be operated, it would lock the other against movement because the rack is limited in its movement by the stop 21. The operation of registering votes in this instance, is exactly the same as before described, as the arms 101, of the spider 100, are returned to their normal position, they will contact with the stud 20ˣ of this particular rack and reset it. The movement of the rack by the arms can readily take place, as the teeth on the rods 8, are entirely free of the pinions so that while the latter will be rotated, they will not impart motion to the rack. Obviously, when the various racks are arranged so as to move sufficient to permit but one ball for a candidate to be voted, the movement of the rods 8, or 8ᵃ, will return the racks to their normal position, and the arms of the spider will not act on the studs, except perhaps when all the parts are all set ready for voting, these arms may be positioned up against the studs.

Referring to Fig. 16, I have illustrated mechanism which is used in conjunction with the mechanism described to vote for primary elections. For the purpose of clearness, let it be supposed that the same parties referred to are in the field with candidates. Under these conditions, all the candidates of a particular party will be locked to one of the rings 164, by operating the set screws 165ᵃ. If a voter desires to vote for the Republican candidates, he so informs the precinct officer who controls the levers 165ˣ. This officer then lowers one of the levers 165ˣ, and it is provided with two pins which will drop in behind the rings 164, designated "Democrat" and "Socialist" in Fig. 16, and will lock the levers 79, controlling the candidates of these parties, so that only Republican candidates can be voted for. And if a Democrat appears and desires to vote, a lever will be lowered and will lock the Republican and Socialist candidates, or if a Socialist is to vote, the proper lever will be lowered to lock the Democratic and Republican rings against movement. By this construction, a voter of one party cannot vote for the candidate of another party, which is quite essential in a primary election.

After the ballots are all cast, either in a regular or primary election, the precinct officer unlocks the housing 159, and rotates the rod 140, which elevates the roller 133, and brings the paper into contact with the name plates. Then the handle 57, is raised and the drum is rotated, and through frictional contact with the annular surface 145, and the flange 50, the paper is fed under the registers and the name plates and the names of the candidates and the total vote cast for each, is printed on the strip of paper. The cam 156, is so timed that it will operate the knife 150, to sever the strip into sections upon each revolution of the drum, so that the entire tabulated vote will be printed on separate strips of paper for the convenience of as many voters as may desire them.

By arranging the parts as described, I am enabled to arrange in alphabetical order the names of candidates for a particular office, to comply with certain State laws. That is to say, the names of the candidates for governor, or for any other office, are printed in groups, alphabetically in order, and yet the operating mechanism for such offices may with convenience and economy be located to accommodate this arrangement, the number making little or no difference.

In Fig. 20, I have shown on a small scale, a much larger machine than that referred to in the foregoing description. In this instance, the drum will in height about equal the height of the voter, and illustrates somewhat the possibilities and capacity of machines constructed according to my invention. A machine of this style could accommodate approximately four hundred (400) candidates.

It is desirable to indicate to a voter how many voters have preceded him and what his number is. I have, therefore, on the frame provided a numbering device 200, and the inscription "The net total of the vote is." This device is operated when the handle 57, is elevated, the arm 92, striking against lug 201 on the broad frame and thereby operating the registers.

In order to provide absolute secrecy for the voter when casting his ballot, and at the same time provide convenient means for obtaining access to the pencil 35, to write the name of the independent candidate, a curtain 210, is secured to the frame having the sight opening 180. This curtain hangs from the frame, over one side of the top of the casing, and over the key 67, as shown in Fig. 1.

The printing mechanism is not only designed to print a complete record of the vote after the voting period is over, but is also adapted to clearly and unmistakably indicate the condition of the counting registers before the voting commences. That is to say, when the mechanism is set for voting, a precinct officer may set the printing mechanism and then rotate the drum. This will imprint on the strip the names of the candidates, etc., and if the registers are properly set will print opposite the names a series of zero marks, proving that all the registers are in position to start the voting operation. The strip may be retained by the proper office, as proof that when the machine was set for voting no register had been tampered with. The position of the registers having been proven, the printing mechanism is reset, the safety door is locked and the machine is in readiness for voting.

If desired, the sheets on which the names are printed may be transparent, and a light positioned in the casing directly opposite the point where the drum is located for voting position, whereby to enable the voter to readily see the name of his candidate. This feature may be necessary if perchance the voter's sight is bad, or if the weather is cloudy.

What I claim is:

1. In a voting machine, the combination of a casing, a freely rotatable drum, a plurality of registers and register setting mechanisms mounted on the drum, a key on the casing to operate any individual setting mechanism when the drum is turned to present one of said setting mechanisms adjacent said key, means for limiting the number of the register setting mechanisms which can be set by the key, and means for simultaneously operating the set registers to tabulate the votes cast.

2. In a voting machine, the combination of a casing, a freely rotatable drum, a plurality of registers and register setting mechanisms mounted on the drum, a key in the casing to operate any of the register setting mechanisms when the drum is turned to present one of said setting mechanisms adjacent said key, means for limiting the number of the register setting mechanisms which can be set by the key, and means including a handle and gearing for simultaneously operating the set registers to tabulate the votes and return the drum to normal position.

3. In a voting machine, the combination of a casing formed with an opening, a frame formed with a sight opening and operating over the opening in the casing, a drum freely rotatable in the casing and provided in its periphery with a memorandum of the offices and the candidates, a plurality of registers and register setting mechanisms mounted on the drum to correspond with the candidates to be voted for, a key on the casing for operating any one of the register setting mechanisms, and a handle operatively connected with the frame to cover the opening in the casing and simultaneously operate the set registers to tabulate the votes cast.

4. In a voting machine, the combination of a casing formed with a sight opening, a horizontally disposed freely rotatable drum mounted in the casing and adapted to receive on its periphery the names of the candidates and the offices they seek, whereby the same may be observed through the sight opening, registers and register setting mechanisms mounted on the drum, there being a register for each candidate, a key on the casing to operate any one of the register setting mechanisms, means for limiting the number of register setting mechanisms which can be operated by the key, and means for simultaneously operating the set registers to tabulate the votes cast.

5. In a voting machine, the combination of a casing formed with a sight opening, a horizontally disposed freely rotatable drum mounted in the casing and adapted to receive on its periphery the names of the candidates and the offices they seek, whereby the same may be observed through the sight opening, registers and register setting mechanisms mounted on the drum, there being a register for each candidate, a key on the casing to operate any one of the register setting mechanisms means for limiting the number of register setting mechanisms which can be operated by the key, means for simultaneously operating groups of register setting mechanisms by the key to vote a party ticket, and means for simultaneously operating the set registers to tabulate the votes cast.

6. In a voting machine, the combination of a casing formed with a sight opening, a horizontally disposed freely rotatable drum mounted in the casing and adapted to receive on its periphery the names of the candidates and the offices they seek, whereby the same may be observed through the sight opening, registers and register setting mechanisms mounted on the drum, there being a register for each candidate, a key on the casing to operate any one of the register setting mechanisms, means for limiting the number of register setting mechanisms which can be operated by the key, means for simultaneously operating a group of register setting mechanisms by the key to vote a party-ticket, and means for simultaneously operating the set registers to tabulate the votes cast for the individual candidates and the number of party votes and also returning the drum to normal position.

7. In a voting machine, the combination of a casing formed with a sight opening, a frame formed with an opening and operating over the sight opening, a horizontally disposed freely rotatable drum mounted in the casing and adapted to receive on its periphery the names of the candidates and the offices they seek, whereby the same may be observed through the openings, registers and register setting mechanisms mounted on the periphery of the drum, there being a register for each candidate, a key on the casing to operate any one of the register setting mechanisms, means for limiting the number of register setting mechanisms which may be operated by the key, and means including a handle connected with the frame for simultaneously operating the set registers to tabulate the votes cast, and to return the drum and the previously operated setting mechanisms to normal position.

8. In a voting machine, the combination of a casing formed with a sight opening, a horizontally disposed freely rotatably mounted drum adapted to receive on its periphery the names of the candidates for a particular office in alphabetical order, a register on the periphery of the drum for each candidate and for a group or groups of candidates, a register setting mechanism for each register including a pinion, a gear common to all the pinions, a key on the casing for operating any one of the register setting mechanisms, and means for rotating the gear to operate the set registers to tabulate the votes cast and for returning the setting mechanisms previously operated and the drum to normal position.

9. In a voting machine, the combination of a casing formed with a sight opening, a horizontally disposed and freely rotatable drum mounted in the casing and adapted to receive on its periphery the names of the candidates and the offices they seek, a plurality of registers and register setting mechanisms mounted on the periphery of the drum, a key for operating any one of the register setting mechanisms, means for operating certain register setting mechanisms for voting for party candidates, means whereby one or more of the party candidates may be "scratched" and the register setting mechanisms of such party and of such "scratched" candidates returned to normal position and other register setting mechanisms operated, means for operating the set registers to tabulate the votes cast, and means for unsetting the registers and returning the drum to normal position.

10. In a voting machine, the combination of a casing formed with a sight opening, a drum freely rotatable in the casing and provided on its periphery with the names of the candidates and the offices they seek, a plurality of registers including disks having numbers on the periphery thereof and mounted on the periphery of the drum, a register setting mechanism for each register including a rod which terminates opposite the name of a candidate, a sleeve on the rod, interlocking means between the disks and the sleeve, said registers being arranged in adjacent rows, the registers in one row being intermediate the registers in the adjacent row, a key for operating any one of the rods to set the interlocking means, means for operating the set registers to tabulate the votes and for subsequently unsetting the counters.

11. In a voting machine, the combination of a casing, a drum freely rotatable in the casing and provided on its periphery with the names of the candidates and the offices they seek, a register and register setting mechanisms for each candidate including a toothed rod, a sleeve, disks, interlocking means between the disks and sleeve, pinions mounted on the drum with which the toothed rods engage, racks arranged to coöperate with groups of pinions, means to limit the movement of each rack to permit of voting determinate candidates in the group, a key on the casing for operating the register setting mechanisms of any one of the registers, means for rotating the sleeves to operate the registers to tabulate the votes cast, and means for unsetting the registers and returning the racks to normal position.

12. In a voting machine, the combination of a casing formed with a sight opening, a freely rotatable drum mounted in the casing and provided on its periphery with the names of the candidates and the offices they seek and which is visible through the sight opening, a register and register setting mechanism on the drum for each candidate, a key on the casing to operate any one of the register setting mechanisms, means for limiting the number of registers that may be set by the key, means for positioning the drum with reference to the key to assure the voter that the register of the candidate he has selected is opposite the key and that such candidate is to receive the vote, and means for operating the set registers to tabulate the votes cast.

13. In a voting machine, the combination of a casing formed with a sight opening, a drum freely rotatable in the casing and provided on its periphery with the names of the candidates and the offices they seek and which may be observed through the sight opening, a plurality of registers mounted on the drum, register setting mechanism on the drum for each register having a part extending adjacent the name of a candidate, a key on the casing for operating any one of the register setting mechanisms, a key on the casing for unsetting any one of the setting mechanisms, means for rotating the drum to enable a voter to select a candidate, means for operating the set registers to tabulate the votes cast, and means for subsequently returning the setting mechanisms to normal position.

14. In a voting machine, the combination of a casing formed with a sight opening, a freely rotatable drum mounted in the casing and provided on its periphery with the names of the candidates and the offices they seek, a plurality of registers mounted on the periphery of the drum, a register setting mechanism for each register, a key on the casing for operating any one of the register setting mechanisms, means coöperating with certain of the register setting mechanisms to simultaneously operate other register setting mechanisms when the key is pressed, whereby to cast a straight party vote, independent voting mechanism carried by the drum and operatively connected with certain of the registers, means for permitting a voter to "scratch" a party vote and operate a register setting mechanism representing an independent candidate, means for limiting the number of registers which may be set by the key, and means including a handle for unsetting the registers and returning the drum to normal position.

15. In a voting machine, the combination of a drum, a plurality of registers mounted on the drum, a plurality of register operating mechanisms mounted on the drum, each operating mechanism comprising a toothed rod, a sleeve mounted on the toothed rod, a pinion on the sleeve, locking means between the sleeve and the registers, a pinion on the drum meshing with the tooth on the rod, a rack with which one or more of the pinions on the drum engage, a key for operating any one of the rods to set a register, means for bringing the drum into voting position, a gear meshing with the pinions on the sleeves, and means for rotating the gear and subsequently unsetting the registers.

16. In a voting machine, the combination of a casing formed with a sight opening, a drum having indicated thereon the names of the candidates and the offices they seek, a plurality of registers mounted on the periphery of the drum to register votes for individual candidates, a plurality of registers mounted on the periphery of a drum to register votes for a plurality of candidates representing a party ticket, a register for each office to register votes for a person not regularly nominated and whose name does not appear as a candidate for the particular office noted on the drum, register setting mechanisms mounted on the drum, a lever coöperatively related with each register setting mechanism, a series of rods coöperating with the levers to operate such of the plurality of register setting mechanisms of the registers representing the individual candidates of a party, whereby when a party register setting mechanism is operated, the register setting mechanisms representing the candidates of said party will be operated, a key on the casing for operating any one of the register setting mechanisms, means for rotating the drum to bring the names of the candidates and the names of the office they seek opposite the sight opening, and means for operating all the set registers.

17. In a voting machine, the combination of a drum provided on its periphery with the names of the candidates and the offices they seek, a plurality of registers mounted on the periphery of the drum, register setting mechanism for each register, means associated with certain of the register setting mechanisms for voting for individual candidates in a party, certain of the register setting mechanisms having associated therewith means whereby upon operation of one of said register setting mechanisms the registers representing all the candidates of a particular party will be set, certain of the register setting mechanisms having means associated therewith for voting for an independent candidate including a rod adapted to be reciprocated and rotated and rollers around which passes a strip of paper, a key on the casing for operating any one of the register setting mechanisms, means for setting the drum in voting position, means for operating the set registers, and means for simultaneously unsetting the registers.

18. In a voting machine, the combination of a casing, a freely rotatable drum having indicated thereon the names of the candidates and the offices they seek, a plurality of registers mounted on the drum, a plurality of register setting mechanisms mounted on the drum, a key on the casing to operate any one of the register setting mechanisms, means for rotating the drum to select a candidate, means for simultaneously operating all the set registers to tabulate the votes cast, means for unsetting the registers, and means for returning the drum to normal position.

19. In a voting machine, the combination of a casing having a sight opening, a freely rotatable drum formed with an opening and mounted in the casing and provided with the names of the candidates and the offices they seek, a plurality of registers mounted on the periphery of the drum, there being a separate register in alinement with each individual name designated on the periphery of the drum, means coöperating with certain of said registers for voting for individuals or parties or groups designated on the periphery of the drum, means coöoperating with other of said registers for voting for persons not nominated and whose names do not appear on the drum, the latter means including a sectional rod adapted to be reciprocated and rotated, a roller on one of said sections adjacent the opening in the drum, reels geared to the afore.. .d roller to discharge and receive a strip of paper, a door coöperating with the opening in the drum, means for opening the door when the rod is reciprocated, means for coupling the rod sections when one section is reciprocated, means for closing the door, a key in the casing for setting any one of the registers, means for operating the registers, and means for upsetting the registers.

20. In a voting machine, the combination of a casing formed with an opening, a drum freely rotatable in the casing, a plurality of registers mounted on the periphery of the drum, said registers being arranged in annular rows, the registers of one row being intermediate the registers of the adjacent row, setting mechanism for each register, a plurality of rods mounted in the drum, a plurality of elements on the rods, means for securing the elements to selected rods for voting a straight party ticket, levers interposed between the setting mechanisms and the rods, certain of said levers having extensions to engage the elements to move the same and the rods connected thereto, a key on the casing to operate any one of the setting mechanisms, means for operating the set registers, and means including a handle and a plurality of pins for returning the setting mechanisms to normal position.

21. In a voting machine, the combination of a casing formed with a sight opening, a freely rotatable drum mounted in the casing and provided on its periphery with the names of the parties, the candidates and the offices they seek, a plurality of registers mounted on the periphery of the drum, register setting mechanisms for each register, certain of said register setting mechanisms including a rod having one end adjacent the name of the candidate or the names of the party on the drum, a sleeve mounted on the rod, a pinion on the sleeve, a gear meshing with all the pinions, means including gearing and a rack and an adjustable stop to limit the number of register setting mechanisms which may be voted, a plurality of sliding rods coöperating with the aforesaid rods, rings, means for locking a plurality of said sliding rods to any one of the rings, levers between the first mentioned rods and the sliding rods, connections between certain of said levers and certain of said rings to move the latter and the sliding rods connected thereto to operate a number of unsetting mechanisms to vote a straight party ticket, a key to operate any one of the setting mechanisms, means for rotating the drum and gear to operate the set registers, and means including a handle and a series of pins acting on the levers to unset the registers.

22. In a voting machine, the combination of a freely rotatable drum provided with the names of the candidates, parties and offices, a plurality of registers on the drum, a type plate adjacent each register, said plate having a type face to indicate the name of the candidate or the question voted on, each register including a plurality of disks provided on their peripheries with numerals, register setting mechanism for each register, a key for operating any one of the register setting mechanisms, means for operating the set registers, means for unsetting the registers, recording mechanism including a rotating inking surface over which passes a strip of paper, means for moving the inking surface into the path of the surfaces of the numerals on the registers and the type plates, and means for revolving the drum and the inking surface to feed the paper and print the total votes cast for each candidate.

23. In a voting machine, the combination of a freely rotatable drum provided with the names of the candidates, parties and offices, a plurality of registers on the drum, a plate having a type face adjacent each register, each register including a plurality of disks provided on their peripheries with numerals, means for setting each register, a key for operating any one of the setting means, means for operating the set registers, means for unsetting the registers, recording mechanism including a roller normally out of the path of the periphery of the disks and the type plates, arms pivotally mounted on the ends of the roller, other rollers supported by the arms, an inking tape passing around the rollers, mechanism for drawing the arms together to elevate the first mentioned roller into the path of movement of the surfaces of the disks and the type faces, and means for rotating the drum and the rollers to cause the numerals and the type plates to print on a sheet of paper interposed between the recording means and the drum.

24. In a voting machine, the combination of a freely rotatable drum provided with the names of the candidates, parties and offices and other matter to be voted on, a plurality of registers on the drum, a plate provided on its face with type adjacent each register, each register including a plurality of disks provided on their peripheries with numerals, setting mechanism for each register, a key for operating any one of the setting mechanisms, means for operating the set registers, means for unsetting the registers, recording mechanism including a rotating inking surface over which passes a strip of paper, means for moving the rotating inking surface into the path of the surfaces of the numerals on the disks and type plates, means for revolving the drum and the inking surface to feed the paper and cause the numerals and the other matter set in type to be printed on the paper, and means operated by the movement of the drum for severing the paper into strips containing a complete record of the condition of the registers.

25. In a voting machine, the combination of a casing, a drum freely rotatable in the casing, registers mounted on the drum, register setting mechanism for each counter, type set adjacent to said registers to designate whom and what said registers represent, a lever coöperating with each register setting mechanism, a pin for each of said levers, a series of rings mounted on the pins, means for locking certain of the pins to certain of the rings, levers for locking all but one ring against movement, a key on the casing for operating any of the register setting mechanisms with which the pins connected to the free ring coöperate, means for operating the set registers, and means including a handle for operating the pins to unset the registers.

26. In a voting machine, the combination of a plurality of registers including numbering disks, register setting mechanism for each register including a rod, a lever coöperating with each rod, a plurality of slidable rods coöperating with the levers, rings on the sliding rods, means for connecting certain of said rings to certain of said rods to permit a voter to vote for a determinate number of candidates, certain of the levers having means coöperating with the rings to move said rings and the sliding rods connected thereto, a second series of sliding rods also coöperating with the levers, elements through which the second series of sliding rods pass, means for locking certain of the latter elements to certain of the second mentioned series of sliding rods when voting for primary candidates, a series of levers coöperating with the elements to lock certain of them against movement to lock out certain register setting mechanisms representing any particular party, a key for operating any one of the register setting mechanisms, means for operating set registers, and means including a handle for operating the second mentioned sliding rods to unset the registers.

27. In a voting machine, the combination of a casing formed with a sight opening, a drum freely rotatable in the casing, and formed with openings, two sets of registers mounted on the periphery of the drum, register setting mechanism for each register, each register setting mechanism of one set of registers including a rod one end of which serves as a pointer to indicate the candidate the register represents, a sleeve loosely mounted on the rod and provided with a pinion, an interlocking connection between each sleeve and a register, each register setting mechanism of the companion set of registers comprising a rod formed in sections and provided with clutch faces, a sleeve loosely mounted on one section of the rod, a pinion on the sleeve, an interlocking connection between each of the latter rods and the latter sleeves, an interlocking connection between each sleeve and its register, a roller on one section of the rod to maintain in position a strip of paper visible through one of the openings in the drum and for independent voting, doors for the openings in the drum, means controlled by the sectional rods for releasing the doors, a key on the casing for operating any one of the register setting mechanisms, means for regulating the number of registers which may be set, a gear engaging all the pinions, means for operating the gear to operate the set registers, and means for subsequently unsetting the registers.

28. In a voting machine, the combination of a casing formed with a sight opening, a drum freely rotatable in the casing and provided on its periphery with grouped names of the candidates for a particular office, a plurality of registers mounted on the periphery of the drum, register setting mechanism for each register including a toothed element, a pinion, a rack with which the pinions mesh, an adjustable stop for regulating the movement of the rack, whereby to limit the number of registers in the group which may be set, a key for operating any one of the register setting mechanisms, means for operating the set registers, and means for unsetting the registers.

29. In a voting machine, the combination of a casing formed with a sight opening, a drum freely rotatable in the casing and provided on its periphery with the names of the candidates, the offices and parties, a plurality of registers mounted on the drum, register setting mechanism for each register, name plates opposite the registers, means coöperating with the registers including a key on the casing to operate certain register setting mechanisms for voting for independent candidates, party votes, scratching a candidate, or voting in groups, means for operating the set registers, printing mechanism coöperating with the registers and the name plates, means for moving the printing mechanism into and out of the path of movement of the registers and the name plates, and means for rotating the drum to make a printed record of the condition of the registers before voting or printing the result of the voting after the voting period is over.

30. A voting machine comprising a freely rotatable drum, a plurality of registers mounted on the drum, register setting mechanism for each register, means for operating any one of the register setting mechanisms, means for operating the set registers, printing mechanism to produce a record to insure said registers being set at zero position before starting to vote with the machine, and means for freely rotating the drum.

31. A voting machine comprising a freely rotatable drum, a plurality of registers mounted on the drum, register setting mechanism mounted on the drum, a key on the casing for operating any one of the register setting mechanisms, a plate adjacent each counter having slugs with raised letters to indicate for what the votes are cast, and means operated by the drum for printing the names of the candidates and the total number of votes cast for each candidate.

32. A voting machine comprising a freely rotatable drum, a plurality of registers mounted on the drum, means for arranging the names of the candidates for a particular office in alphabetical order, register setting mechanism, means for operating the setting mechanism to set the registers in voting position to vote a straight party ticket, or split the party ticket and vote for other candidates without changing the alphabetical order of the names, means for revolving the drum and operating the registers, and means for unsetting the registers.

33. A voting machine, comprising a freely rotatable drum, a plurality of registers and register setting mechanism mounted on the drum, means whereby the names of the candidates for a particular office are arranged in alphabetical order, an independent voting means arranged in each group of candidates for an office, a register for each independent voting means, setting devices for the latter voting means, means for operating all the set registers to register the votes for straight party tickets, means coöperating with the registers to permit a voter to split the straight party ticket and vote with the independent voting means without affecting the alphabetical arrangement of the candidates, and means for unsetting all the set registers.

34. A voting machine comprising a freely rotatable drum, a plurality of registers mounted on the drum, register setting mechanism mounted on the drum, means on the drum associated with certain of the registers to enable voters to cast ballots for independent candidates, said means including a cover which when removed exposes a strip of paper on which the independent votes may be noted, means coöperating with the setting mechanism for limiting the number of registers which may be set in a determined group before the paper is exposed, and means for operating the registers when the drum is rotated.

35. A voting machine comprising a casing formed with a vote indicating opening, a plurality of registers, register setting mechanism for each register, each register setting mechanism including a projection located to move in the plane of the vote indicating opening, the name of the candidate or party being indicated adjacent each projection and having a character covered by said projection, a key on the casing for operating a register setting mechanism, and removing the projection to expose the indicating character, whereby to indicate to the voter that the register operated represents the candidate adjacent the character, and means for operating the registers to tabulate the votes.

36. A voting machine comprising a freely rotatable drum, a plurality of registers mounted on the drum, register setting mechanism mounted on the drum and having associated therewith memoranda to indicate the candidates, the office they seek, the parties they represent, and other questions, a raised character adjacent each item included in the memoranda, a key for operating the setting mechanism, means for operating the registers, and means operated in conjunction with the latter means for rotating the drum.

37. A voting machine comprising a plurality of registers, register setting mechanism for each register including a sliding rod, a sleeve, and interlocking means between the rod and the registers, a key for operating the register setting mechanisms, means for limiting the number of registers which may be set, a key for permitting a voter to unset a register which has been inadvertently set, means for operating the registers, and means for unsetting the registers.

38. A voting machine comprising a plurality of registers, register setting mechanism for each register, means associated with each register for preventing a voter voting for more than one candidate for a particular office, including a toothed rod, a pinion meshing with the tooth on the rod, a rack with which all the pinions representing the candidates for a particular office mesh, means for limiting the movement of the rack, means for operating the registers, and means for unsetting the registers.

39. A voting machine comprising a plurality of registers, means associated with a series of registers for voting a group of candidates including toothed rods, pinions meshing with the teeth on the rods, a rack with which all the pinions which are associated with the registers representing the candidates for a particular office mesh, means for limiting the movement of the rack, means for operating the registers, and means for rotating the drum.

40. A voting machine comprising a drum, a plurality of registers coöperating with the drum, means including a handle for operating the registers, and means including a locking device for locking the drum when the handle is in one position, and releasing the drum when the handle is in any other position.

41. A voting machine comprising a casing formed with a sight opening, a plurality of registers associated with the names of the candidates and mounted on a movable base, a frame formed with an opening and movable over the sight opening, a handle for moving the frame and releasing the base, means for moving the base to bring the names of the candidates opposite the opening and in the line of vision of the voter, and means for operating the registers.

42. A voting machine comprising a rotating drum, a plurality of registers mounted on the drum, independent voting mechanism including a roller which supports a strip on which a vote may be written, a cover for protecting said strip, register setting mechanism for each register, a device operated by a register setting mechanism for releasing the cover to expose the strip, means for closing the cover, and means for rotating the drum and operating the registers and rotating the roller to advance the strip, and means for unsetting the registers.

43. A voting machine comprising a casing formed with a sight opening, voting mechanism mounted in the casing, a key on the casing coöperating with the voting mechanism, a frame formed with an open hood operating over the sight opening, a curtain secured to the hood and overhanging the key, and means for raising and lowering the frame and curtain.

44. A voting machine comprising a casing, freely rotating voting mechanism mounted in the casing including a plurality of registers and a plurality of register setting mechanisms, a key on the casing to operate the register setting mechanisms, and means for locking the key to prevent further voting, said locking means being entirely free of the freely rotating voting mechanisms.

45. A voting machine comprising a rotary support, register operating mechanism carried thereby, means for setting the same, means for unsetting the same, means for subsequently operating the set register operating means, and means for resetting the register operating means.

46. A voting machine comprising a casing, a plurality of series of registers one series for each party, a rotary support for the registers, and a primary lockout for limiting the voting to one series.

47. In a voting machine, the combination with a casing, a freely rotatable drum, candidate registers arranged in office groups on the rotatable drum, a key on the casing, the operation of which sets for operation a register, straight ticket mechanism operated by the key for simultaneously setting for operation any desired candidate registers of the different groups irrespective of their position or location in the groups, and means for subsequently operating the registers so set.

48. In a voting machine, the combination with a casing, candidate registers arranged alphabetically in office groups, a key on the casing, the operation of which sets for operation a register, straight ticket mechanism operated by the key for simultaneously setting for operation the registers in each group devoted to the candidates of any desired party, means for preventing the operation of more candidate registers than there are offices to be filled, and means for subsequently operating the registers so set.

49. A voting machine comprising a casing, a freely rotatable drum in the casing, voting mechanism including registers and register setting mechanisms mounted on the drum, a key on the casing to operate any one of the register setting mechanisms, and means for rotating the drum in either direction to enable a voter to select a candidate.

50. A voting machine comprising a casing, a freely rotatable drum in the casing, a plurality of series of registers, one series for each party and all mounted on the drum, a setting device for each register, a primary lockout for limiting the voting to one series, and a key on the casing for operating any one of the setting devices.

51. A voting machine comprising a rotating drum, a plurality of registers mounted on the drum, register setting mechanism mounted on the drum, a single key for operating any one of the register setting mechanisms, lockout mechanism for certain registers, lockout mechanism for certain groups of registers, an operating lever coöperating with each register setting mechanism connected with a register representing an individual candidate, a sliding rod adjacent each operating lever, means for connecting said rods in groups, means between certain register setting mechanisms and the connecting means for setting a group of registers representing candidates for respective offices when the key is operated, and means for operating the set registers.

52. A voting machine comprising a rotary support, settable register operating means, interlocking means for the register operating means, all carried by the rotary support, means to set the same, means to operate the register operating means after they are set, party voting mechanism coöperating with certain of the settable register operating means including pivoted levers, sliding rods, and means for connecting certain of the rods to move in groups, and means operating on the pivoted levers for returning the parts to normal position.

53. A voting machine comprising a casing, a plurality of series of registers one series for each party, a rotary support for the registers, a primary lockout for limiting the voting to one series including sliding rods, and means including a handle to return the support and the registers to normal position.

54. A voting machine comprising a rotary support, a plurality of registers and register setting mechanisms mounted on the rotary support, independent candidate voting mechanism mounted on the rotary support and coöperating with certain of the register setting mechanisms, said independent voting mechanism including a movable rod, rollers around which a strip of paper passes, a cover, a locking device between the cover and movable rod, and a single key for operating any of the register setting mechanisms.

55. A voting machine comprising a rotary support, registers mounted on the rotary support, register setting mechanisms for the registers, means between certain register setting mechanisms for simultaneously setting a group of registers, a single key for operating any of the setting mechanisms, a key for unsetting any one of the set registers, and means for operating the set registers.

56. A voting machine comprising a rotary support, registers mounted on the rotary support, register setting mechanisms for the registers, means between certain register setting mechanisms for simultaneously setting a group of registers, independent candidate voting means coöperating with certain registers, a single key for operating any of the setting mechanisms, a key for unsetting any one of the set registers except the registers associated with the independent candidate voting means.

57. A voting machine comprising a casing, a plurality of series of registers one series for each party, a rotary support for the resisters, a primary lockout for limiting the voting to one series, including sliding rods, means for locking certain of the rods to move together, and means coöperating with the sliding rods to prevent movement of any but the rods representing the series for a particular party, and means including a handle for restoring the parts to normal position.

58. A voting machine comprising a casing formed with a sight opening, a frame having a hood operating over the sight opening, a rotary support having the names of the candidates thereon, register operating mechanism carried by the rotary support, means for setting the same, means for unsetting the same, means for subsequently operating the set register operating means, and means for resetting the register operating means and drawing the frame over the sight opening.

59. A voting machine comprising a casing formed with a sight opening, a frame having a hood operating over the sight opening, a rotary support, register operating mechanism carried thereby, means for setting the same, means for unsetting the same, means for subsequently operating the set register operating means and drawing the frame over the sight opening.

60. A voting machine comprising a freely rotatable support, printing registers mounted on the support, means for rotating the support to bring each register singly to printing position, means for taking an impression therefrom, means for severing the strip receiving the impression upon each revolution of the support, and means operated by the rotatable support for operating the severing means.

61. A voting machine comprising a freely rotatable support, printing registers mounted on the support, means for operating the printing registers to register votes, means for holding the support stationary while the registers are being operated, means for freeing the support after operation of the registers, means for rotating the support to bring each register singly to printing position, and means for taking an impression therefrom.

62. A voting machine comprising a freely rotatable support, printing registers mounted on the support, means for operating the printing registers to register votes, means for holding the support stationary while the registers are being operated, means for freeing the support after operation of the registers, means for rotating the support to bring each register singly to printing position, means for taking an impression therefrom, and means for severing the strip receiving the impression upon each revolution of the support.

63. A voting machine comprising a casing, a rotary support mounted in the casing, a series of sleeves mounted on the support, a pinion on each sleeve, a register on each sleeve including a pawl to operate the same, interlocking means between each sleeve and pawl, a rod passing through each sleeve, lockout mechanism coöperating with the rods, a gear for rotating the pinions, and a key on the casing to operate any one of the rods to set the registers, and means for rotating the gear to operate the registers.

64. A voting machine comprising a casing, a rotary support mounted in the casing, a series of sleeves mounted on the support, registers mounted on the sleeves including pawls, interlocking mechanism including a sliding rod, a key on the casing to operate any one of the rods to lock a sleeve and a pawl for operating the register, a second key to unset any one of said sleeves, lockout mechanism coöperating with the rods, means carried by the drum to operate the set sleeves to operate the registers when the drum is rotated, means for rotating the drum, and means operable when the drum is rotated to unset the sleeves.

In testimony whereof I have signed my name to this specification in the presence of two subscribing witnesses.

JAMES C. WILSON.

Witnesses:
J. D. YOAKLEY,
JOHN IMIRIE.

Copies of this patent may be obtained for five cents each, by addressing the "Commissioner of Patents, Washington, D. C."